Dec. 6, 1932.   W. H. HUNT   1,889,919
FISH DORSAL FIN CENTERING MEANS
Filed Nov. 17 1930   2 Sheets-Sheet 1
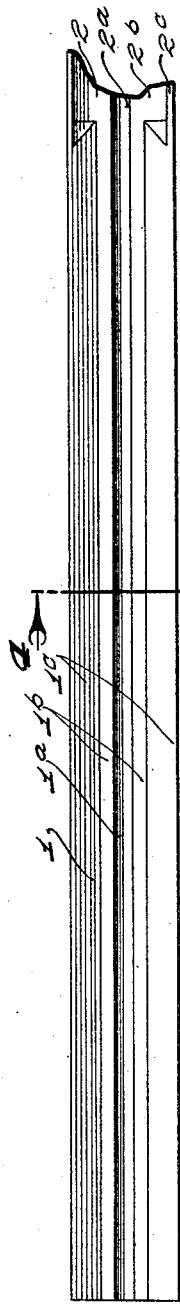
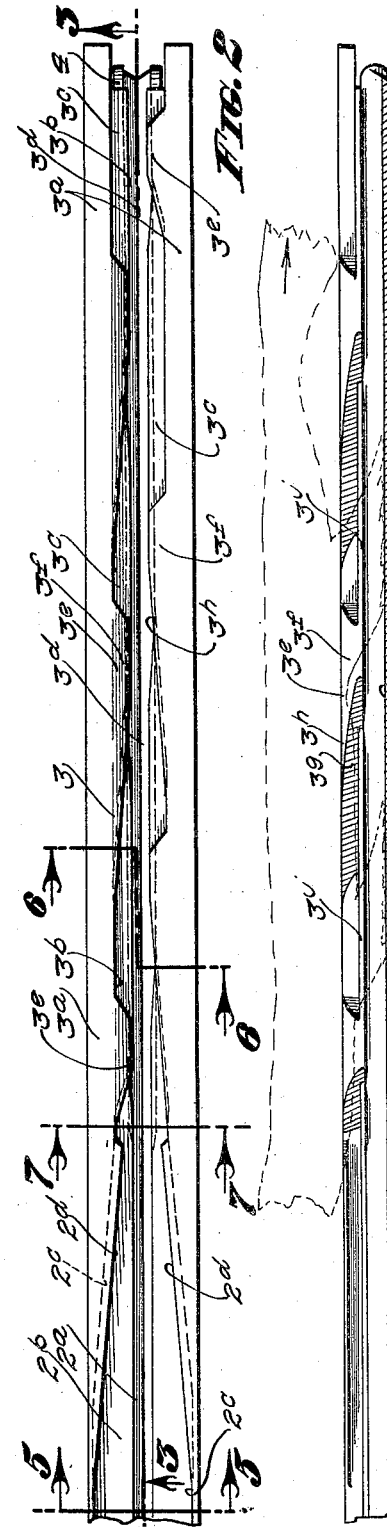
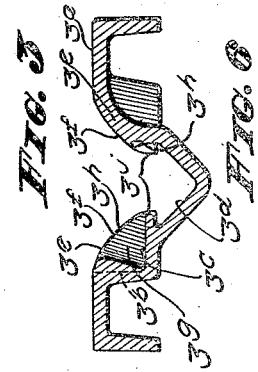
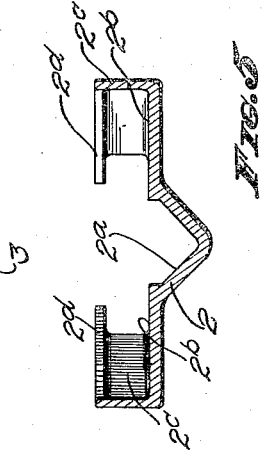
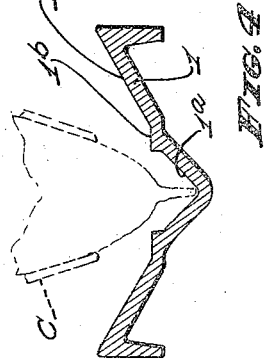
INVENTOR.
WILLIAM H. HUNT
BY A. B. Bowman
ATTORNEY Dec. 6, 1932.  W. H. HUNT  1,889,919
FISH DORSAL FIN CENTERING MEANS
Filed Nov. 17, 1930    2 Sheets-Sheet 2
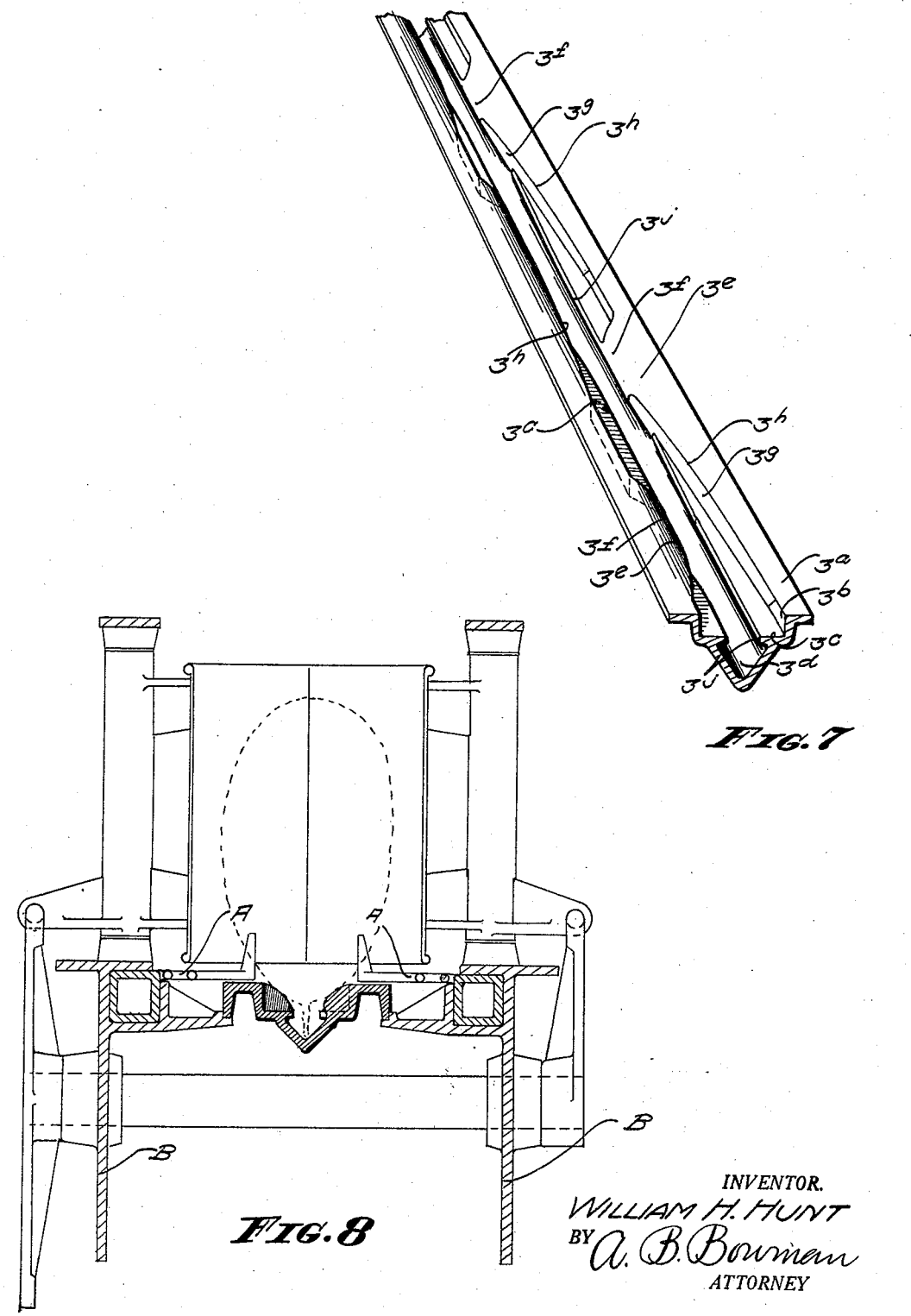
INVENTOR.
WILLIAM H. HUNT
BY A. B. Bowman
ATTORNEY Patented Dec. 6, 1932

1,889,919

UNITED STATES PATENT OFFICE

WILLIAM H. HUNT, OF NATIONAL CITY, CALIFORNIA

FISH DORSAL FIN CENTERING MEANS

Application filed November 17, 1930. Serial No. 496,210.

My invention relates to fish dorsal fin centering means, and the objects of my invention are:

First, to provide a centering means which alines the dorsal fins in accurate vertical disposed relation with the tail;

Second, to provide a means of this class, whereby the dorsal fins are held from buckling or shifting out of place once they are alined;

Third, to provide a means of this class which has no moving parts, but operates as the fish is shifted thereover by a conveyor or the like;

Fourth, to provide a means of this class which acts upon all the dorsal fins, even though they be considerably crooked or twisted;

Fifth, to provide a means of this class which is positive in its action, and which operates on the fins even though the fish is shifted rapidly thereover; and Sixth, to provide on the whole a novelly constructed fish dorsal fin centering means, which is simple of construction, efficient in its action, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon, which form a part of this application, in which:

Figure 1 is a fragmentary plan view of the receiving end of my fish dorsal fin centering means; Fig. 2 is another plan view thereof continuing from Fig. 1; Fig. 3 is a longitudinal sectional view through 3—3 of Fig. 2; Fig. 4 is an enlarged transverse sectional view through 4—4 of Fig. 1; Fig. 5 is a transverse sectional view through 5—5 of Fig. 2; Fig. 6 is a transverse sectional view through 6—6 of Fig. 2; Fig. 7 is a fragmentary perspective view, the section of the fore end of the view being taken substantially through 7—7 of Fig. 2; and Fig. 8 is a transverse sectional view of my means shown in connection with a fish body positioning and conveying apparatus.

Similar characters of reference refer to similar parts and portions throughout the several views of the drawings.

My fish dorsal fin centering means is relatively long, and of substantially constant width so as to fit between a pair of conveyors, as indicated by A in Fig. 8. These conveyors are supported by the framework B, also forming a part of the machine with which my centering means is used. The framework means supports a fish preliminary centering means C, disclosed in my co-pending application, Serial Number 478,079. This fish preliminary centering means engages the sides of the fish and retains it in a position with the belly up and back down.

This receiving end comprises a centrally located, elongated V-shaped, trough 1a which is bordered along each side by a step 1b. Continuing outwardly from the steps 1b are marginal portions 1c having downwardly converging side walls. The side walls of the marginal portion 1c are disposed with less slope than the side walls of the trough 1a.

The forward end of the receiving portion 1 joins a preliminary guide or centering portion 2. A V-shaped trough 2a which is a continuation of the trough 1a, occupies the center of the preliminary guide portion. The trough 1a is flanked by horizontally disposed areas 2b corresponding to the steps 1b. The margins of the preliminary guide portion 2 are provided with vertically disposed walls 2c, which converge toward the discharge end of the preliminary guide portion 2, and which are provided with overhanging rims 2d. These overhanging rims prevent the fins which may not have entered the trough 2a from overriding the walls 2c.

At the forward or discharge end of the preliminary guide means, the walls 2b join the marginal portion 3a of the final centering portion 3 of my dorsal fin centering means. The upper surface of the marginal portion 3a is substantially flush with the overhanging rims 2d.

The inner or adjacent sides of the marginal portions terminate in vertically extending walls 3b, flush with the side walls 2b, at the discharge ends thereof.

Inwardly from the walls 3b, there are provided narrow ledges 3c, forming a continuation of the horizontal areas 2a. These ledges 3c are spaced apart by a V-shaped channel 3d, forming a continuation of the channels 1a and 2a.

The ledges 3c are interrupted by fin-deflectors 3e, which are arranged in staggered relation therealong. The upper or supporting surface 3f of each fin-deflector 3e curves from the upper surface of the marginal portions 3a to the inner or vertical edges of the ledges 3c.

The supporting surfaces 3f of the fin-deflectors 3e are substantially trapezoidal in plan, with their longer parallel sides arranged along the inner sides of the corresponding marginal portions 3a, and their shorter parallel sides along the inner edges of the corresponding ledges 3c, as shown best in Figs. 2 and 3.

The rear side of each fin-deflector 3e forms the working side 3g thereof. Beginning at the inner side of the corresponding marginal portion 3a, the working side 3g of each fin-deflector extends forwardly at an acute angle until it terminates at the inner margin of the corresponding ledge 3c. This working side 3g is cut under so that the edge thereof adjoining the upper surface 3f of the fin-deflector forms a scraping edge sharp enough to catch the fins and deflect them against the ledges 3c, but too dull to cut them; this edge is indicated by 3h.

The inner edges of the ledges 3c overhang the upper margins of the V-shaped groove or channel 3d forming retaining means 3j. These retaining means 3j diminute and disappear rearwardly of each deflector 3e, and the succeeding retaining means 3j continues forwardly from the rear or working side 3g of the fin-deflectors, as shown best in Figs. 3 and 7. The fish fins are thus deflected downwardly against the ledges 3c and are conducted therealong and underneath the retaining means 3j.

The inner margin of the ledges 3c at the forward ends of the final centering portion is provided with a suitable joint 4, which enables it to be connected to a fish fin and tail guide and directing mechanism, described in my co-pending application, Serial Number 508,899.

In order to properly center a fish between closely disposed cutting blades, it is necessary that the fish pass therebetween tail first. A fish fin comprises a plurality of bones which are joined to the body of the fish so as to rotate from a position longitudinally with the fish's body flat against the same, and pointing towards the fish's tail to a position substantially at right angles to the body.

The extremities of the fin bones on most fish are quite sharp. A membrane connects the bones and forms the fin. Now, if the fins spread to their extended position, the points of the fin bones catch even on very smooth metal so that the fish rises on its fins, until they give way with a jerk, causing a very erratic travel of the fish. For this reason, the troughs 1a, 2a, and 3d are arranged deep enough to receive the fins when in or almost in their retracted positions without supporting the weight of the fish thereon, and shallow enough to keep the fin bones at the proper acute angle with the surface of the troughs to prevent their catching. The weight of the fish is carried by the marginal portions 1c, horizontal areas 2b, and upper surfaces 3f of the fin-deflectors 3e.

The problem is further complicated by the fact that the fins for one reason or another are often distorted out of shape and tend to assume their distorted positions instead of their natural positions. Fins in such a condition do not readily enter the troughs 1a. Many of these fins are caught by the overhanging rims 2d. The fins that escape the overhanging rims 2d are acted upon by the working sides 3g of the fin-deflectors 3e, which force the fins, even if bent laterally against the side of the fish, into the channel 3d. As the retaining means 3h diminute and disappear into the working sides 3g of the fin-deflectors 3e, the fins are conducted into the channel 3d below said retaining means. Once in the channel 3d, the retaining means prevent the fins from again coming out.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. The combination with a fish body positioning means and fish conveyor apparatus, of a fish fin centering means, including a trough, and angularly disposed deflectors arranged along the margins of said trough for guiding fish fins riding along said margins into said trough.

2. The combination with a fish body positioning means and fish conveyor apparatus, of a fish fin centering means, including a V-shaped trough, ledges arranged along the upper margins of said trough, and deflector means arranged in staggered relation along said ledges and in angularly disposed relation to said trough for deflecting fish fins riding along said ledges into said trough.

3. The combination with a fish body positioning means and fish conveyor apparatus, of a fish fin centering means, including a V-shaped trough, ledges arranged along the upper margins of said trough, deflector means arranged in staggered relation along said ledges and in angularly disposed relation to said trough for deflecting fish fins riding along said ledges into said trough, the working sides of said deflector means being undercut for deflecting said fish fins against said ledges and facilitating the guiding of said fish fins into said trough.

4. The combination with a fish body positioning means and fish conveyor apparatus, of a fish fin centering means, including a trough, overhanging ledges extending along the margins of said trough, deflector means arranged in staggered relation along said ledges and in angularly disposed relation to said trough for deflecting fish fins riding along said ledges into said trough, the working sides of said deflector means being undercut for deflecting said fish fins against said ledges and facilitating the guiding of said fish fins into said trough, the overhanging portions of said ledges interrupted by the working sides of said deflector, whereby fish fins engaged by said deflector means are guided into said trough.

5. The combination with a fish body positioning means and fish conveyor apparatus, of a fish fin centering means, including a V-shaped trough, ledges arranged along the upper margins of said trough, and deflector means arranged in staggered relation along said ledges and in angularly disposed relation to said trough for deflecting fish fins riding along said ledges into said trough, the upper surfaces of said deflector means arranged to support a fish as it passes thereover, relieving the weight of said fish from said fins.

6. The combination with a fish body positioning means and fish conveyor apparatus, of a fish fin centering means, including a trough, overhanging ledges extending along the margins of said trough, deflector means arranged in staggered relation along said ledges and in angularly disposed relation to said trough for deflecting fish fins riding along said ledges into said trough, the working sides of said deflector means being undercut for deflecting said fish fins against said ledges and facilitating the guiding of said fish fins into said trough, the overhanging portions of said ledges interrupted by the working sides of said deflector, whereby fish fins engaged by said deflector means are guided into said trough, the upper surfaces of said deflector means arranged to support a fish as it passes thereover, relieving the weight of said fish from said fins.

7. In a fish fin centering means, means for contracting the fins of a fish passing therealong, a trough continuing from said fin contracting means, angularly disposed deflector means arranged along the margins of said trough for guiding said fins into said trough, and overhanging ledge means for retaining said fins in said trough.

8. In a fish fin centering means, means for contracting the fins of a fish passing therealong, a trough arranged in continuation of said fin contracting means, angularly disposed deflector means arranged along the margins of said trough for guiding said fins into said trough, and ledge means for retaining said fins in said trough, the upper surfaces of said deflector means forming supports for the body of a fish passing along said trough.

9. In a fish fin centering means, means for contracting the fins of a fish passing therealong, a trough arranged in continuation of said fin contracting means, said trough being V-shaped and of a depth insufficient to allow spreading of said fins, whereby said fins are retained in their contracted position, angularly disposed deflector means arranged along the margins of said trough for guiding said fins into said trough, and ledge means arranged along the margins of said trough for retaining said fins in said trough.

10. In a fish fin centering means, means for contracting the fins of a fish passing therealong, a trough arranged in continuation of said fin contracting means, said trough being V-shaped and of a depth insufficient to allow spreading of said fins, whereby said fins are retained in their contracted position, angularly disposed deflector means arranged along the margins of said trough for guiding said fins into said trough, and overhanging ledge means for retaining said fins in said trough, the upper surfaces of said deflector means forming supports for the body of a fish passing along said trough.

11. The combination with a fish body positioning means and fish conveyor apparatus, of a fish fin centering means, including a V-shaped trough, ledges arranged along the upper margins of said trough, and deflector means arranged in staggered relation along said ledges and in angularly disposed relation to said trough for deflecting fish fins riding along said ledges into said trough, said trough being V-shaped and of a depth insufficient to allow spreading of said fins, whereby said fins are retained in their contracted position.

12. In a fish centering means, a V-shaped trough, and means for supporting a fish above said trough, said trough shaped and arranged to receive the fins of a fish passing thereover, and provided with overhanging ledges shaped and arranged to retain said fins in a contracted position, whereby said fins ride along the apex of said trough.

13. In a fish fin centering means, a V-shaped trough, means for supporting a fish above said trough, said trough shaped and arranged to receive the fins of a fish passing thereover, and shaped and arranged to retain said fins in a contracted position, whereby said fins ride along the apex of said trough, and angularly disposed deflecting means for guiding said fins into said trough.

14. In a fish fin centering means, a V-shaped trough, means for supporting a fish above said trough, said trough shaped and arranged to receive the fins of a fish passing thereover, and shaped and arranged to retain said fins in a contracted position, whereby said fins ride along the apex of said trough, angularly disposed deflecting means for guiding said fins into said trough, overhanging ledges along the upper margins of said trough, said ledges coacting with said deflecting means for guiding said fins into said trough, and providing means for retaining said fins in said trough.

In testimony whereof, I have hereunto set my hand at San Diego, California, this 10th day of November, 1930.

WILLIAM H. HUNT.